March 27, 1928.
H. D. MATTHEWS ET AL
1,664,221
METHOD OF TESTING ELECTRIC HEATING DEVICES
Filed May 27, 1926
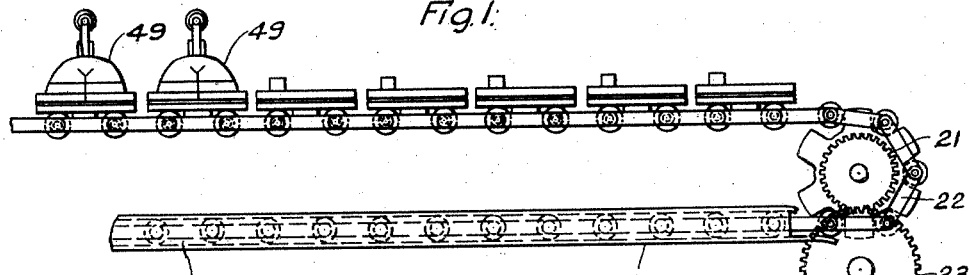
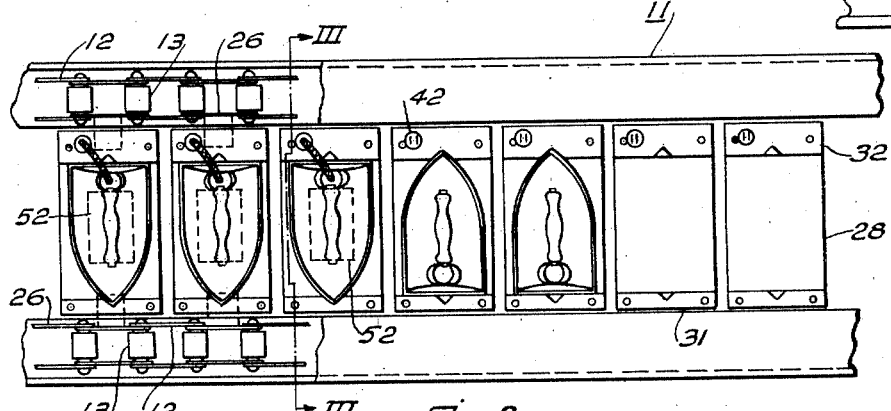
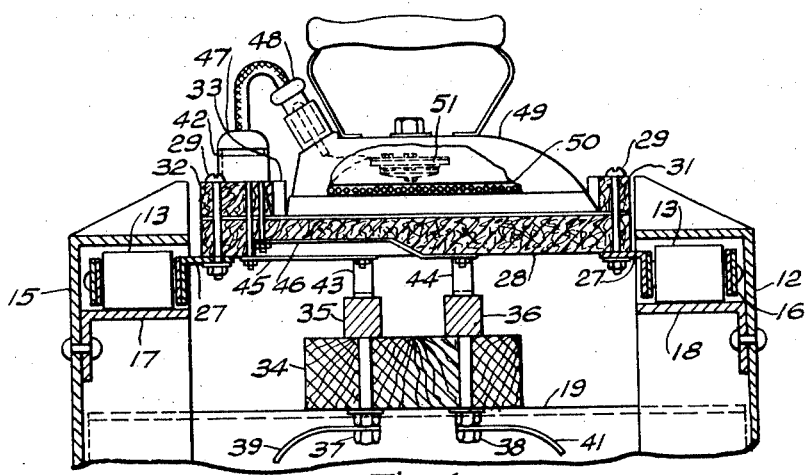
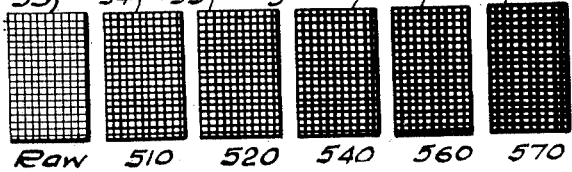
WITNESSES
E.A. McCloskey
H.M. Bichel
INVENTORS
Howard D. Matthews
and Ralph F. Bisbee.
BY Wesley G. Carr
ATTORNEY Patented Mar. 27, 1928.

1,664,221

UNITED STATES PATENT OFFICE.

HOWARD D. MATTHEWS AND RALPH F. BISBEE, OF MANSFIELD, OHIO, ASSIGNORS TO WESTINGHOUSE ELECTRIC & MANUFACTURING COMPANY, A CORPORATION OF PENNSYLVANIA.

METHOD OF TESTING ELECTRIC HEATING DEVICES.

Application filed May 27, 1926. Serial No. 112,183.

Our invention relates to electric heating devices and particularly to methods of testing such devices.

An object of our invention is to provide a relatively simple means for, and method of, testing electric heating devices as to their operating temperatures.

In practicing our invention, we provide an endless moving means upon which electric heating devices, such as electric flat irons, may be assembled and mounted, a small piece of treated fibrous material being located between each iron and its support and the irons being energized for a predetermined length of time, their operating temperatures being indicated by the degree of scorching of the respective pieces of fibrous material.

In the single sheet of drawings,

Figure 1 is a fragmentary view, in side elevation, of a material-moving means employed in the method embodying our invention, Fig. 2 is a top plan view thereof, Fig. 3 is a view in lateral section therethrough taken on the line III—III of Fig. 2, and Fig. 4 is a top plan view of a plurality of pieces of cloth after having been subjected to the scorching test.

It is highly desirable, in the manufacture of electrically-heated flat irons, that a test be made, under conditions approximating normal operating conditions, to ascertain the temperature of each iron at its operative face in order to determine the effectiveness of the iron when put into actual operation. When a relatively large number of irons are manufactured daily, the method of testing them becomes an important item, and any simple method of testing during the assembly thereof is of great importance.

The method embodying our invention is practiced in connection with a conveyor system for moving the irons from one place to another and will be described in connection therewith, although it is not limited thereto.

A conveyor 11 comprises a plurality of chain links 12 and rollers 13 which may be of any desired construction usually employed for endless conveyors. Two sets of such chain links and associated rollers are located in properly spaced relation to operate in supporting and guiding means comprising structural metal members 15 and 16 and angle members 17 and 18 associated therewith to form a track of substantially channel shape for the upper run of the endless conveyor 11. Cross bars 19 may be provided, as shown more particularly in Fig. 3 of the drawing, at suitable intervals in order to brace the structure supporting the endless conveyor.

The chain links and rollers run over suitable sprocket wheels 21 at the ends of the structure, a train of gear wheels 22, 23 and 24 being driven by an electric motor 25 to cause continuous slow movement of the endless conveyor. The details of construction of the conveyor, of the transmission gears and of the motor constitute no part of our invention and are shown for purposes of illustration only.

The chain links 12 on the inner faces of the respective chains alternate with special links 26 which differ from the others in that they are provided with laterally extending portions 27. Plates 28 of heat-resistant and electric-insulating material are secured to the extensions 27 by means of a plurality of machine bolts 29 whereby the two sets of chain links and rollers are held in properly spaced positions relative to each other. End portions 31 and 32, also of asbestos lumber, are provided on each of the plates 28 and extend laterally of these plates. A relatively thin sheet of renewable asbestos cloth 33 is also provided on each of the plates 28.

The cross bars 19 support members 34, which are preferably of an electric insulating material and have spaced bus bars 35 and 36 mounted thereon and suitably secured thereto by bolts 37 and 38 which may also constitute terminal members therefor to which the ends of supply-circuit conductors 39 and 41 are suitably connected.

A contact socket 42 is mounted on each of the laterally extending bars 32, the terminals in the socket member 42 being connected to spring contact members 43 and 44 by any suitable means here shown as metal strips 45 and 46. As the plates 28, connected to the respective spaced chains, move the contact members 43 and 44 yieldingly engage the bars 35 and 36 and, if a contact plug 47 is located in the socket 42 and a connecting plug 48 is placed in proper operative position on an electric iron 49, a heating element 50 located therein will be energized and the iron will be heated. A thermally-actuable switch 51 is provided in each iron to control the operating temperature thereof.

The particular details of construction of the electrically-heated iron 49 are of no particular importance, as the method embodying our invention may be employed in connection with any electrically-heated iron to determine its operating temperature.

In employing the method embodying our invention, the irons are assembled by one or more operators located at the right-hand portion of the conveyor, if the top run of the conveyor is assumed to move toward the left. When any one of the plates 28 has moved a predetermined distance, an iron 49 will have been completely assembled and will be located on one of the plates 28. An inspection is made of the newly assembled irons 49 after which they are so located on the plates 28 that the terminal members thereof will be at the back of the plate to permit of the contact plug 48 being inserted to energize the iron.

Before placing the irons on the respective plates 28, a small piece 52 of a fibrous material, such as muslin, is placed on the thin sheet 33 and in immediate engagement with the bottom face of the iron 49. The piece 52 is initially treated by wetting in a weak solution of sulphuric acid and water and is then passed through a wringer to remove the excess water and to leave the slightly acid fluid spread uniformly in the fabric. The fabric is then dried and cut into relatively small pieces which may be placed beneath the respective irons on the plates 28.

Energization of the individual irons 49 is permitted to continue for a predetermined length of time, after which they are deenergized by pulling out the contact plug 48. The operator then picks up the irons consecutively and inspects the small pieces of fabric 52.

Fig. 4 illustrates, to at least an approximate degree, the condition and appearance of pieces of cloth that have been subjected to the ironing surfaces of the respective electric irons at different temperatures.

The fabric, indicated by numeral 53, is the raw or unscorched cloth. After the temperature of the iron has reached approximately 510° F., its appearance will be as indicated by the numeral 54. Numerals 55, 56, 57 and 58 indicate, approximately, the appearance of the scorched pieces of fabric for the temperatures noted therebelow, and the operator is thus enabled to easily and quickly determine the maximum temperature reached by the operating surfaces of electric irons after they have been energized for predetermined lengths of time. It is, of course, evident that, if the piece of fabric has the appearance indicated by the numeral 53 or even that indicated by numeral 54, the temperature of the operating surface was relatively low and such an iron might prove unsatisfactory for ordinary ironing operations. On the other hand, if the fabric is badly scorched, as indicated by the numeral 58, the iron has attained too high a temperature and should be rejected. In other words, an operator can determine, by observation of a small piece of fabric which has been subjected to heat from the operating surface of an electric iron for a predetermined length of time, whether that electric iron will reach the proper temperature in normal use. No complicated readings as to actual temperatures, by means of thermocouples or other devices, is, therefore, necessary, the appearance along the scorched fabric giving an accurate indication of the temperature attained.

When a thermally-actuable control means, such as the device 51, is associated with the iron or other device, the hereinabove described method of obtaining an indication and record of the temperature of the device, will give also some idea of the operativeness of the thermal control device. Thus, if it is known that all of the thermal control devices are adjusted for a maximum temperature of say 560° F. and one or more pieces of fabric are scorched as shown at 58, it may indicate that the thermal control means did not operate properly to limit the temperature to 560° F.

Our invention thus provides a relatively simple and inexpensive method of determining the operating temperatures of electric heating devices, and more particularly of electric irons, without the necessity of providing expensive and complicated heat-measuring devices.

Various modifications may be made in the method embodying our invention without departing from the spirit and scope thereof and we desire that only such limitations shall be placed thereon as are imposed by the prior art and the appended claims.

We claim as our invention:

1. The method of determining the relative temperature rises of a plurality of similar electrically-heated devices which comprises energizing said devices for a predetermined length of time while in close operative engagement with cooperating pieces of fibrous materials initially wetted in a weak solution of acid and dried, and then noting the colors of the respective pieces of fibrous materials.

2. The method of determining the temperature rise of an electric iron which comprises energizing an iron for a predetermined length of time while located on a piece of acid-treated cloth and then noting the degree of scorching effect on said cloth.

3. The method of determining the temperature rise of an electric iron which comprises energizing an iron for a predetermined length of time while located on a piece of cloth initially wet in a weak acid solution and dried and then noting the degree of scorching effect on said cloth.

4. The method of determining the temperature rise of an electric iron which comprises energizing an iron for a predetermined length of time while located on a piece of cloth initially wet in a weak solution of sulphuric acid and dried and noting the degree of scorching effect on said cloth.

5. The method of determining the temperature rise of an electric iron which comprises energizing an iron for a predetermined length of time while located on a piece of cloth initially wet in a one quarter of one percent solution of sulphuric acid in water and dried and noting the degree of scorching effect on said cloth.

In testimony whereof, we have hereunto subscribed our names this 19th day of May, 1926.

HOWARD D. MATTHEWS.
RALPH F. BISBEE.